(12) United States Patent
Thönebe

(10) Patent No.: US 6,176,144 B1
(45) Date of Patent: Jan. 23, 2001

(54) PRESSURE MEDIUM OPERATED ACTUATOR WITH A POSITION REGULATOR

(75) Inventor: Werner Thönebe, Barsinghausen (DE)

(73) Assignee: Hartmann & Braun GmbH & Co. KG, Eschborn (DE)

( * ) Notice: Under 35 U.S.C. 154(b), the term of this patent shall be extended for 0 days.

(21) Appl. No.: 09/373,466

(22) Filed: Aug. 12, 1999

(30) Foreign Application Priority Data

Aug. 29, 1998 (DE) .................................. 19839510

(51) Int. Cl.[7] ...................................... F16H 21/18
(52) U.S. Cl. .................................................. 74/45
(58) Field of Search ............................. 74/45, 53

(56) References Cited

U.S. PATENT DOCUMENTS 944,121 * 12/1909 Allan ........................................ 74/45

* cited by examiner

Primary Examiner—Dirk Wright
(74) Attorney, Agent, or Firm—Michael M. Rickin

(57) ABSTRACT

A pressure medium operated actuator with a position regulator for regulated action on the opening and closing actuation of, for example, a process valve, and with a transmission device for transmitting the movement of a driving member to the position regulator. In order, in a position regulator of this type, to utilize a material pairing which is advantageous per se and, at the same time, to achieve movement transmission which is free of play even in the long term, the position regulator is provided with a resetting lever having a polygonal rotary slide which is prestressed in the manner of a torsion spring and which, by tilting slightly under a torsion spring effect, engages between two parallel round-rod portions of a driver connected to the push-rod.

12 Claims, 2 Drawing Sheets

PRESSURE MEDIUM OPERATED ACTUATOR WITH A POSITION REGULATOR

FIELD OF THE INVENTION

This invention relates to a pressure medium operated actuator with a position regulator for regulated action on the opening and closing of, for example, a process valve, and with a transmission device for transmitting the movement of a driving member to the position regulator and more particularly to such an actuator which has reduced actuating inaccuracies.

DESCRIPTION OF THE PRIOR ART

Pressure medium operated actuators of the type described above are used, for example, for actuating process valves. In this case, high actuating accuracy is required, making it necessary to use a position regulator which compensates system-induced actuating inaccuracies.

Actuating inaccuracies may develop from an essentially calibrated initial state, for example when wear occurs due to friction. This is to be detected by the position regulator and a corresponding actuating correction is to be carried out thereby. Yet even the pickup between the actuating member and regulator is subject to wear. The mechanical transmission of movement between driving member and position regulator has to in the long term, be reliable and consequently free of play.

This problem of the coupling of movement between driving member and position regulator so as to be free of play even in the long term is illustrated, inter alia, in DE 42 39 432 C2.

In this context, the transmission of movement, in most cases, is from a linear movement of the actuator into a rotational movement of the return lever of the position regulator.

Most valve and regulator manufacturers satisfy this requirement by equipping a lever on the regulator shaft with a rigid bolt which penetrates into a long hole of a drive-side sheet-metal angle piece. In order to eliminate the play between the bolt and long hole during the upward and downward movement of the driving or push-rod, the bolt is braced on one side in the long hole of the sheet-metal angle piece by means of a wire spring.

Due to the linear movement of the push-rod and the rotational movement of the return lever, relative movement occurs between the sheet-metal angle piece and the bolt. Since said parts interact frictionally with one another, this also results in corresponding wear. A play is produced which can no longer be compensated by the wire spring after a corresponding operating period. This results, in turn, in time-dependent hysteresis which thus leads to considerable inaccuracies.

In order to eliminate this problem, there are, as is also shown in the above mentioned prior art, known principles in which, instead of a metallic connection between bolt and sheet-metal angle piece, an axially resiliently mounted plastic cone presses on the regulator lever on the push-rod side between two round rods.

A disadvantage of this solution is that, due to regulator mounting tolerances, the axial prestress of the cone differs greatly, and therefore loads of varying intensity act on the regulator lever, particularly in the case of long levers, thus having repercussions on the mounting of the regulator shaft.

Proceeding from this, the present invention uses a material pairing which is advantageous per se and, at the same time, to achieve movement transmission which is free of play even in the long term.

SUMMARY OF THE INVENTION

In a pressure medium operated actuator of the with a position regulator for regulated action on the opening and closing of actuable device and with a transmission device for transmitting the movement of a driving member to the position regulator, the position regulator is provided in accordance with the present invention with a resetting lever having a polygonal rotary slide which is prestressed in the manner of a torsion spring and which, by being tilted slightly by a torsion-spring effect, engages between two parallel round-rod portions of a driver connected to the push-rod.

It is essential, in the polygonal rotary slide described above, that the play between the round-rod portions of the driver and the jaw span of the polygonal rotary slide be eliminated by the tilting of the latter. That is to say, the dimensioning of the polygonal rotary slide in relation to the spacing of the two round-rod portions is selected in such a way that the spring prestress keeps the rotary slide in a more or less tilted position. The play occurring due to wear is consequently eliminated by a virtually self adjusting tilting.

At the same time, the arrangement is selected in such a way that the forces acting on the resetting lever have no axial component acting as a bending moment on the resetting lever and/or on the regulator shaft-bearing.

The advantage is that reliable and consistently play-free coupling between position regulator and driving rod is maintained. The sensing of the actuating travel and, consequently, regulation as such thereby remains virtually free of hysteresis. Moreover, the parts are very simple to assemble and the material combination between plastic and steel or high-grade steel ensures minimal wear.

DESCRIPTION OF THE PREFERRED EMBODIMENT(S)

Figure 1:
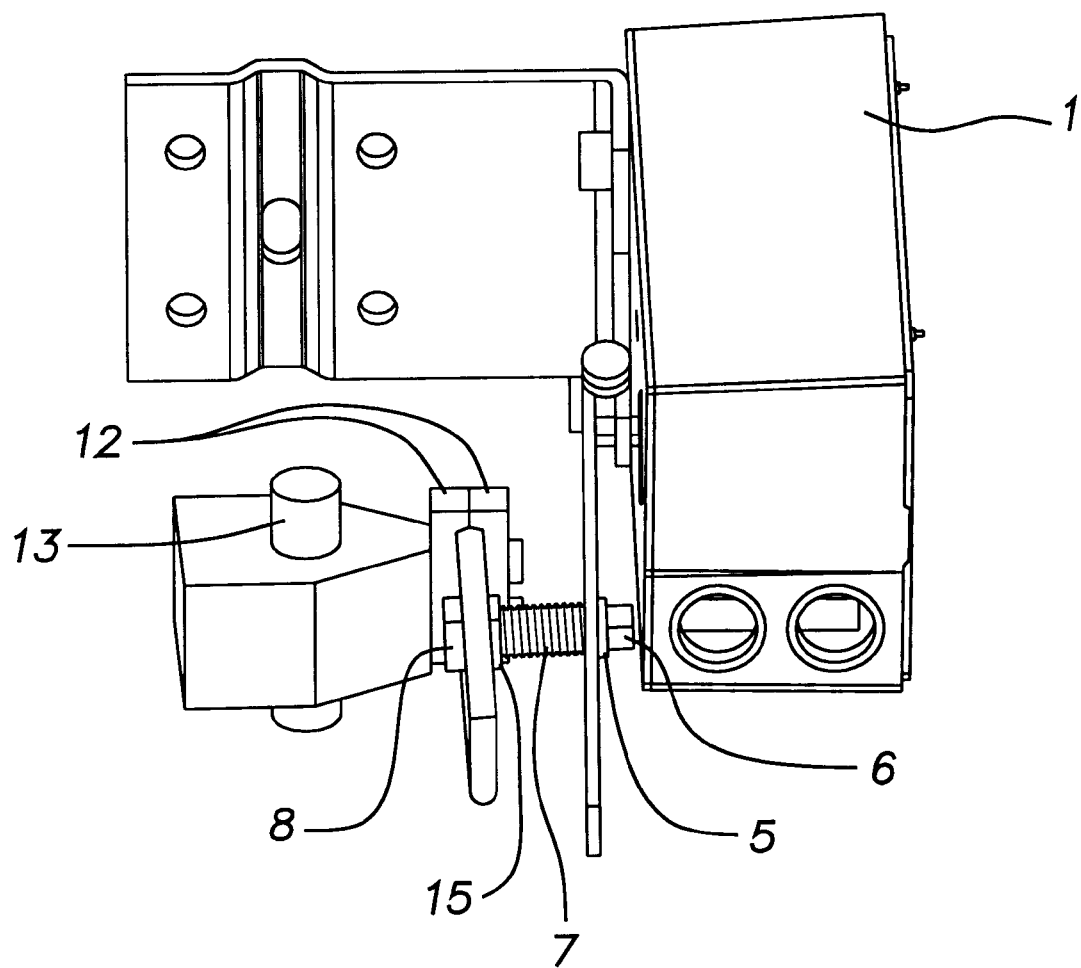
FIG. 1 shows a perspective view of the position regulator.
Figure 2:
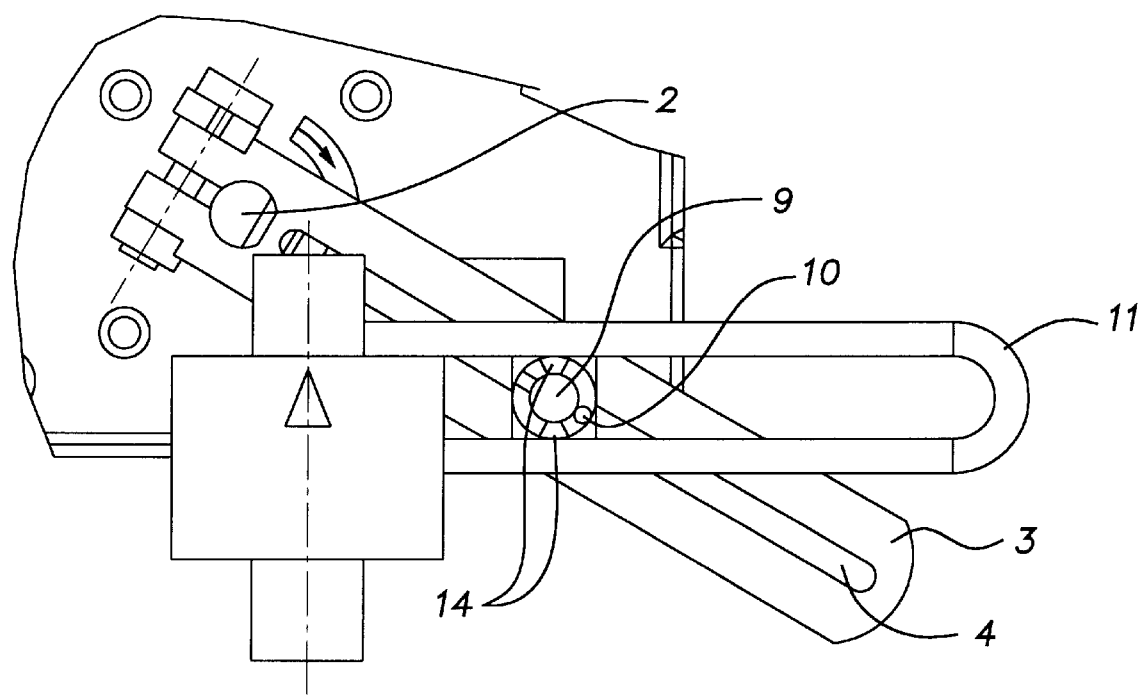
FIG. 2 shows a side view of the coupling region between the position regulator and valve rod.

FIG. 1 and FIG. 2. are to be looked at alternately in the following text and correlated with the subsequent description. FIG. 1 shows the position regulator with the inventive coupling between position regulator shaft and the driving or push-rod of the valve which is not illustrated in any more detail.

As is shown in FIG. 2, the position regulator 1 is equipped on the valve side, on its rear wall, with a lever 3 on the regulator shaft 2. This lever 3 carries a bolt 9 which is displaceable in the long hole 4 of said lever and which is rigidly fastened by means of its washer 5 and nut 6 (see FIG. 1). As is shown in FIG. 1, the bolt 9, in turn, carries a wire spring 7 and a rotary slide 8 made of plastic.

According to the invention, the torsion spring 7 has to perform three functions:

First, with its lower inside diameter designed for frictional connection, it absorbs the axial and radial prestress of the upper spring part. Second, with the upper winding part wound with spacing, it generates a prestress, directed axially relative to the bolt 9, on the rotary slide 8 which is supported on the pin 10 inserted transversely to the bolt 9 so as to move easily. Third, the spring 7 generates a torque on the rotary slide 8, so that the play between the rotary slide 8 and the parallel round-rod portions of the driver 11 which is fastened to the push-rod 13 through the holding device 12, is eliminated.

The abrasion on the rotary slide 8, which is unavoidable due to the relative movement of the rotary slide 8 in the driver 11, is constantly compensated by the actuating force of the torsion spring 7.

Another feature of this design is that, when the regulator 1, including the lever components 4, . . . , 10, is removed from the valve, the rotary slide 8 can be stress-relieved only as far as the abutment 14 on the pin 10 as a result of the torque of the torsion spring 7. The ribs 15 of the rotary slide 8 prevent the possibility that the rotary slide 8 cannot be pushed through the driver 11 when being mounted on the valve, which would otherwise lead to handling problems during further assembly.

Overall, this coupling is expedient, can be easily assembled and ensures long fault-free operation.

It is to be understood that the description of the preferred embodiment(s) is (are) intended to be only illustrative, rather than exhaustive, of the present invention. Those of ordinary skill will be able to make certain additions, deletions, and/or modifications to the embodiment(s) of the disclosed subject matter without departing from the spirit of the invention or its scope, as defined by the appended claims.

What is claimed is:

1. A pressure medium operated actuator comprising:

a position regulator for regulated action on the opening and closing actuation of an actuable device;

a mechanical transmission device for transmitting the movement of a driving member to said position regulator;

a push-rod; and a driver with two parallel round-rod portions connected to said push-rod;

wherein said position regulator is provided with a resetting lever having a polygonal rotary slide which is prestressed in the manner of a torsion spring and which, by being tilted slightly under a torsion spring effect, engages between said two parallel round-rod portions of said driver.

2. The actuator of claim 1 wherein said rotary slide has a quadrangular outer contour.

3. The actuator of claim 2 wherein said two parallel round-rod driver portions of said driver have a spacing in the region of engagement of said rotary slide and at least two parallel outer edges of said rotary slide have a spacing from one another which is slightly smaller than said spacing of said two parallel round-rod portions in the region of engagement.

4. The actuator of claim 1 wherein said rotary slide consists of plastic.

5. The actuator of claim 2 wherein said rotary slide consists of plastic.

6. The actuator of claim 3 wherein said rotary slide consists of plastic.

7. The actuator of claim 1 wherein said round-rod portions which are in engagement with said rotary slide consists of high-grade steel.

8. The actuator of claim 2 wherein said round-rod portions which are in engagement with said rotary slide consists of high-grade steel.

9. The actuator of claim 3 wherein said round-rod portions which are in engagement with said rotary slide consists of high-grade steel.

10. The actuator of claim 4 wherein said round-rod portions which are in engagement with said rotary slide consists of high-grade steel.

11. The actuator of claim 5 wherein said round-rod portions which are in engagement with said rotary slide consists of high-grade steel.

12. The actuator of claim 6 wherein said round-rod portions which are in engagement with said rotary slide consists of high-grade steel.

\* \* \* \* \*